United States Patent [19]
Habermann et al.

[11] Patent Number: 4,828,718
[45] Date of Patent: May 9, 1989

[54] CATALYTIC DEGRADATION OF OXIDIZABLE ORGANIC AND INORGANIC COMPOUNDS IN WATERS

[75] Inventors: Wolfgang Habermann, Mainz, Fed. Rep. of Germany; Hubert Engelhardt, Ludwigshafen; Wolfgang Geiger, Plankstadt; Udo Mayer, Frankenthal; Peter Hammes, Ruppertsberg; Werner Simmler, Ludwigshafen, all of Fed. Rep. of Germany

[73] Assignee: BASF Aktiengesellschaft, Ludwigshafen, Fed. Rep. of Germany

[21] Appl. No.: 151,960

[22] Filed: Feb. 3, 1988

[30] Foreign Application Priority Data

Feb. 7, 1987 [DE] Fed. Rep. of Germany ....... 3703837

[51] Int. Cl.$^4$ ................................................. C02F 1/72
[52] U.S. Cl. ..................................... 210/763; 210/908; 502/150
[58] Field of Search ........ 210/762, 763, 766, 908–910; 502/150, 162–172

[56] References Cited

U.S. PATENT DOCUMENTS

| 3,823,088 | 7/1974 | Box et al. | 210/763 X |
| 3,988,259 | 10/1976 | Ray | 210/762 X |
| 4,048,097 | 9/1977 | Douglas | 502/163 |
| 4,049,572 | 9/1977 | Douglas | 502/163 |
| 4,696,749 | 9/1987 | Habermann et al. | 210/763 X |
| 4,751,005 | 6/1988 | Mitsui et al. | 210/762 X |

FOREIGN PATENT DOCUMENTS

| 0173880 | 12/1986 | European Pat. Off. |  |
| 3316265 | 2/1984 | Fed. Rep. of Germany | 210/763 |
| 1185975 | 6/1968 | United Kingdom. |  |

OTHER PUBLICATIONS

Chemical Abstracts, Air Pollution & Industrial Hygiene, vol. 71, 1969 p. 255.
Chemical Abstracts, Physical Organic Chemistry, vol. 75, 1971, p. 285.
Chemical Abstracts, vol. 105, 1986, p. 322.
Chemical Abstracts, Catalysis, Kinetics, vol. 106, 1987, p. 409.

Primary Examiner—Tom Wyse
Attorney, Agent, or Firm—Keil & Weinkauf

[57] ABSTRACT

Oxidizable for organic and/or inorganic compounds in waters are subjected to catalytic degradation using a catalyst applied to an oxygen-storing inert carrier, for example of graphite, coke, a non-gassing coal or active carbon. The carrier used is coated with a cationic dye complexed with heteropolyacids and/or polyacids and/or salts or metal acids of subgroups V to VIII.

The advantages of the process include the prevention of biological growth on the catalyst surface by the biocidal dye cation and the avoidance of calcium and magnesium deposits on the catalyst surface through the presence of the cationic solid.

10 Claims, No Drawings

CATALYTIC DEGRADATION OF OXIDIZABLE ORGANIC AND INORGANIC COMPOUNDS IN WATERS

In industry, the oxidative treatment of water is carried out using active carbons which make it possible to bind the pollutants and the oxygen in fairly high concentration on the carbon surface, so that biological and chemical degradation is accelerated. Compared with water, these carbons absorb about 800 times the amount of oxygen, some of the oxygen being chemisorptively bound and reacted by a two-electron step (Berl mechanism) in accordance with the equation

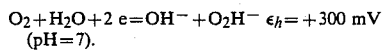
(pH=7).

In this process, the chemical and biological oxidation takes place on the polarized carbon particles or via the reaction product hydrogen peroxide, which is obtained in the reduction of oxygen. The active carbons are produced industrially by partial oxidation of carbon in the presence of steam, oxygen, alkali metal salts, alkali metal hydroxides and the like at elevated temperatures, or by coking carbon-containing materials with zinc chloride, iron chloride, phosphoric acid or other water-removing substances, or by igniting active carbon in an inert atmosphere, for example in nitrogen or hydrogen, or under reduced pressure.

All processes mentioned give active carbons which permit reduction of oxygen only by the Berl mechanism.

Other chemical oxidative pretreatments too, for example with nitric acid, sulfuric acid, oleum or nitric acid/sulfuric acid, nitric acid/hydrogen peroxide or sulfuric acid/chromic acid mixtures at $> +120°$ C. and with nitrogen dioxide at $< +300°$ C., result in no substantial improvement in the catalytic activity.

The disadvantage of an oxidative treatment of wastewater using the oxidation catalysts mentioned is that a number of organic pollutants, e.g. humic acids, fulvic acid, aromatics or chlorohydrocarbons, undergo oxidative degradation only with difficulty, if at all, at the potentials in the Berl mechanism.

A process has also been proposed which permits the oxidative treatment of wastewaters with carbon-containing catalysts and oxidizing agents at fairly high potentials if a carbon carrier is used which is anodically oxidized at potentials $\epsilon_h$ of from $+1.3$ to $10$ V and then doped with molybdenum(VI) and/or tungsten(VI) and/or vanadium(V) compounds.

In the case of these catalysts, the presence of microorganisms may result in biological growth and lime deposits on the catalyst surface. This process leads to a lowering of the potentials and a reduction in the catalytic activity.

It is an object of the present invention to carry out the degradation of the oxidizable organic and/or inorganic water ingredients at high potentials and, during this procedure, to avoid biological growth and coating of the catalyst surface with extraneous metal cations, e.g. calcium.

We have found that this object is achieved, and that these disadvantages are avoided and the catalytic degradation of oxidizable organic and/or inorganic compounds in waters can be carried out with carbon-containing catalysts and oxidizing agents at fairly high potentials without biological growth and lime deposits, if an inert carrier which is coated with cationic dyes laked with heteropolyacids and/or polyacids and/or metal salts or metal acids of subgroup V to VIII.

The carriers used are inert substances capable of storing oxygen, advantageously carbon carriers, for example coals, lignites, coke, non-gassing coals, active carbon intermediates, active carbons and anthracite. Zeolites and carriers based on silica may also be used. Various active carbons, coke and graphite are preferably used.

The carriers can be doped with molybdenum(VI) and/or tungsten(VI) and/or vanadium(V) compounds. Doping can be carried out, for example, by impregnating the carbon carriers with aqueous ammonium molybdate and/or tungstrate and/or vanadate solutions, which are then converted to the corresponding metal oxides or sulfides by thermal or chemical treatment.

The following cationic dyes may be used:

| triarylamine dyes, eg. | | | | xanthene dyes, eg. | | |
|---|---|---|---|---|---|---|
| Basic green | 4 | C.I. | 42,000 | Basic violet | 10 | 45,170 |
| | 1 | | 42,040 | Basic violet | 11 | 45,175 |
| blue | 1 | | 42,025 | Basic violet | 1 | 45,160 |
| | 5 | | 42,140 | Oxazine dyes, eg. | | |
| violet | 14 | | 42,510 | Basic blue | 4 | 51,004 |
| violet | 2 | | 42,520 | Basic blue | 6 | 51,175 |
| red | 5 | | 42,500 | Thiazine and phenazine dyes, eg | | |
| Solvent blue | 23 | | 42,760 | | | |
| Basic violet | 3 | | 42,555 | Basic blue | 9 | 52,015 |
| Basic violet | 4 | | 42,600 | Basic blue | 24 | 52,030 |
| blue | 26 | | 44,045 | Basic red | 5 | 50,040 |
| blue | 7 | | 42,595 | Methine dyes, eg. | | |
| blue | 8 | | 42,563 | Basic violet | 16 | 48,013 |
| blue | 158 | | | Basic red | 12 | 48,065 |
| violet | 50 | | | | | |
| Azo dyes, eg. | | | | | | |
| Basic yellow | 28 | | 48,054 | Metal complex dyes, eg. amidated, aminomethylated iron and/or manganese phthalocyanines carrying quaternary ammonium groups | | |
| Basic red | 46 | | | | | |
| Basic blue | 41 | | 11,105 | | | |
| Basic red | 18 | | 11,085 | | | |

Preferably used cationic dyes are triarylmethane dyes, e.g. Basic green 4 C.I. 42,000, Basic violet 14 C.I. 42,510, Basic red 5 C.I. 42,500, Basic violet 3 C.I. 42,555, blue 158 and violet 50 and Solvent blue 23 C.I. 42,760, xanthene dyes, e.g. Basic violet 10, C.I. 45,170, Basic violet 11 C.I. 45,175 and Basic violet 1 C.I. 45,160, and azine dyes, e.g. Basic blue 9 C.I. 57,030. Heteropolyacids used are acids which consist of metal acids of subgroups V to VIII and non-metal acids of main groups IV to VII of the Periodic Table of Elements. Preferred heteropolyacids are those which consist of metal acids of molybdenum and/or tungsten and/or vanadium and non-metal acids or phosphorus and silicon. Suitable polyacids are acids of vanadium and/or of molybdenum and/or of tungsten.

Coating of the carbon-containing carriers with the cationic dyes laked with heteropolyacids or polyacids can be carried out with impregnation of the dye solutions followed by laking with heteropolyacid solutions. Examples of suitable solvents for the cationic dyes are water, aqueous acetic acid and alkanols. Water is preferably used as the solvent. The concentration of the cationic dye in the solution may be from 0.001 to 10% by weight.

From 0.01 to 0.1% strength by weight solutions are preferred. From 0.01 to 10 g, preferably from 0.05 to 2 g, of the cationic dye are applied per liter of carbon-containing catalyst carrier. Suitable solvents for the heteropolyacids and/or polyacids are water or oxygen-containing organic solvents, e.g. ethyl acetate, ethyl ether or propyl ether. Water is preferably used. The concentration of the heteropolyacids or polyacids may be from 0.001 to 10, preferably from 0.02 to 0.2, % by weight, based on the solution.

Instead of the heteropolyacids and/or polyacids, it was also possible to use the salts and acids of subgroups V to VIII for laking. Ammonium heteropoly or ammonium poly compounds of molybdenum and/or of tungsten and/or of vanadium and/or potassium polytantalates, acidotantalates, acidoniobates and/or peroxyacids of niobium or of tantalum and/or alkali metal manganates or permanganates are preferably used.

Coating with the cationic dyes laked with polyor heteropolyacids can also be carried out by absorbing finely divided, laked pigments, suspended in an aqueous or organic solvent, on the surface of the inert carrier.

In the industrial embodiment, the carrier coated with the laked, cationic dyes is preferably used as granules in filter beds in fixed-bed reactors through which the pollutant-containing water saturated with oxygen and other oxidizing agents flows from above. These filter beds can be operated in such a way that the voids between the granules are flooded with liquid (wet procedure) or still contain gas, e.g. air or oxygen, as in, for example, trickle beds (dry procedure). To increase the oxygen concentration in the water, the process can be carried out under pressure. The particle size of the material should be uniform, particle sizes of from 2 to 6 mm being preferred.

In the event of soiling, the filter beds can be freed from the coarse impurities by back-washing with water and air.

Instead of the filter beds in which flow takes place downward from above, it is possible to use beds in which flow takes place in an upward direction. Depending on the flow rate, such beds may be operated as an expanded bed or fluidized bed, and air or oxygen may also be passed in. In this case, more finely divided granules of, for example, from 0.5 to 2 mm may be used. It is also possible to coat immersed or suspended particles with the catalyst.

Catalyst beds which are contaminated on the surface and partially deactivated can be regenerated by treatment with water which has a low pollutant content and contains oxidizing agents. An industrially advantageous procedure comprises operation with circulated wastewater containing oxidizing agents, without the introduction of fresh wastewater. The oxidizing agent used may be air, oxygen or hydrogen peroxide. Depending on the degree of contamination, regeneration can be carried out in from 1 to 10 hours or, in the case of very severe contamination, in a few days.

In another embodiment, the catalyst coated with laked, cationic dyes is introduced in the form of powder into the wastewater. In this process technology, it is important to ensure good mass transfer, for example by stirring. The supply of oxidizing agent must be controlled so that the potential $\epsilon_h$ of the catalyst particles is +600 mV relative to the potential of the hydrogen electrode in the wastewater.

The process can be carried out under from 1 to 300 bar and at from 0° to 400° C. but is preferably effected under pressures greater than 10 bar and at above 120° C. for wastewaters which are difficult to degrade, for example dump waters.

The coated carbon carriers may be in the form of porous tubes and sheets which are activated and doped on one side, the wastewater flowing past on the active side while air or oxygen is passed through the carbon carrier from the other side, which may be rendered water repellant.

It is also possible to activate and dope the surface of graphite, active carbon or carbon felts and fabrics, through which the wastewater containing pollutants and oxidizing agents flows.

When removing pesticides and aromatic chlorohydrocarbons from oxygen-containing ground waters and surface waters having a low pollutant content, it is advantageous to use active carbon filter beds having a particle size of <0.5 mm or coated active carbon felts or active carbon fabrics.

When oxidizing agents other than oxygen or hydrogen peroxide are used, for example iron(III) nitrate, iron(III) chloride, iron(III) sulfate or iron(III) nitrate/hydrogen peroxide or iron(III) sulfate/hydrogen peroxide mixtures or the like, it is advantageous to use filter beds or finely divided powders through which the water flows.

The cationic dyes fixed to finely divided carbon carriers by heteropolyacids or polyacids can also be used in cooling circulations containing surface waters to prevent biological growth. Complexed phenothiazine dyes, e.g. methylene blue, are preferably used.

In the preparation of industrial water, it is possible to use filter beds consisting of active carbons which are coated with triphenylmethane and/or phenothiazine dyes complexed with heteropolyacids or polyacids, for treatment and germ removal in, for example, swimming pools.

Furthermore, it is possible to protect ion exchangers from biological growth and degradation, for example in water softening, by adding complexed phenothiazine dyes on carbon-containing carriers.

EXAMPLE 1

Active carbon granules having a length of 5 mm and a diameter of 3 mm are impregnated with a 0.006% strength by weight aqueous solution of Basic violet 50 for about 15 minutes. 0.12 g of dye is used per liter of active carbon granules. Thereafter, the carbon laden with the dye is treated for about 15 minutes with an aqueous 0.02% by weight phosphomolybdic acid solution so that not more than 0.4 g of phosphomolybdic acid are bound per liter of active carbon.

If the coated carbon granules are used in a filter bed of a laboratory test apparatus operated with oxygen-saturated outflow water from a wastewater treatment plant, the following mean values for TOC and COD degradation are obtained during a residence time $$T = \frac{\text{bed volume}}{\text{wastewater volume flow}}$$

of 30 minutes:

| TOC content in the feed mg/l | TOC content in the outflow mg/l | COD content in the feed mg/l | COD content in the outflow mg/l |
|---|---|---|---|
| 65 | 10 | 165 | 45 |

Biological growth and lime deposits on the carbon carrier are not observed after a test period of 6 months. Contamination by coarse particles is eliminated by back-washing for about 5 minutes every 10 to 30 days with the same outflow water from the wastewater treatment plant.

EXAMPLE 2

Active carbon granules having a particles size of from 0.2 to 0.5 mm are impregnated with an aquoeus 0.05% strength solution of the dye

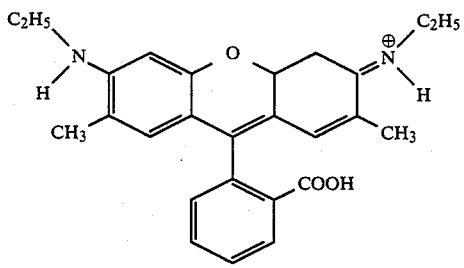

for 15 minutes. ~1 g of dye is used per liter of active carbon granules. The carbon laden with the dye is then treated for 15 minutes with a 0.02% strength by weight aqueous phosphomolybdic acid solution.

If the coated carbon granules are used in a filter bed operated with oxygen-containing water contaminated with pesticides, the following degradation values are obtained:

| Pesticide content in the feed (bentazone) ppb | Pesticide content in the outflow (bentazone) ppb |
|---|---|
| 55 | <1 |

EXAMPLE 3

An active carbon powder having a particle size of from 50 to 100 μm is treated for 20 minutes with a 0.012% strength aqueous solution of Basic blue 158 so that about 0.26 g of dye are bound per liter of active carbon. Thereafter, the carbon impregnated with the dye is treated for about 15 minutes with an aqueous 0.2% strength by weight phosphomolybdic acid. The material coated in this manner is suitable as a catalyst in the thermal cracking of seepage water with oxygen at elevated temperatures and under superatmospheric pressure. A suitable amount of catalyst is about 100 g of coated carbon granules per m$^3$ of seepage water.

EXAMPLE 4

Ten graphite tubes having a length of 500 mm, an external diameter of 60 mm, an internal diameter of 40 mm and an open porosity of 16% are impregnated with a 0.05% strength by weight aqueous solution of the dye as in Example 2. The tubes are then immersed for about 15 minutes in a 0.2% strength by weight aqueous phosphovanadic acid solution. After this treatment, the tubes are installed vertically in a cylindrical vessel so that the tube axes are about 100 mm apart. Air is forced along the tube bore, while wastewater flows around the outer surfaces. The air pressure inside the tubes is chosen so that the air just passes through the tube walls. This arrangement is preferably used for the treatment of severely contaminated wastewaters, for example dump waters.

EXAMPLE 5

Graphite granules having a length of 3 mm and a diameter of 2 mm are anodically oxidized in 50% strength by weight aqueous nitric acid for 8 minutes at a current density of 6 kA/m$^2$ (based on the geometrical surface area) and at a potential $\epsilon_h$ of 2.2 V. Thereafter, the granules are washed thoroughly with water and impregnated with a 0.05% strength by weight aqueous solution of Basic green 4 (C.I. 42,000). After this treatment, the granules impregnated with the dye are immersed for about 15 minutes in a 0.2% strength by weight aqueous tungstophosphoric acid. The catalyst is suitable for the oxidation of pesticides in acidic wastewaters with oxygen or hydrogen peroxide.

EXAMPLE 6

Active carbon granules having a length of 5 mm and a diameter of 3 mm are impregnated with a 2% strength by weight aqueous ammonium molybdate solution, dried for 3 hours at +80° C. and then heated for 1 hour at +120° C. under nitrogen. The granules pretreated in this manner are impregnated with a 0.8% strength by weight aqueous solution of Basic blue 9 (C.I. 52,015). After this treatment, the impregnated granules are immersed in a 0.2% strength by weight aqueous phosphomolybdic acid solution. The catalyst is suitable for the oxidation of pollutants in wastewaters having a high germ count.

EXAMPLE 7

Graphite granules are anodically oxidized and then impregnated with a 0.5% strength aqueous solution of Basic violet 5, these tests being carried out as described in Example 5. After this treatment, the granules are immersed for about 15 minutes in a 0.3% strength by weight aqueous phosphovanadic acid solution. This catalyst is suitable for the oxidation of chlorohydrocarbons, e.g. chloroacetone, o-chloropyridine, chloroacetic acid, chloral and chloroacetal, in the presence of iron(III) ions and hydrogen peroxide.

EXAMPLE 8

0.2% by weight of a finely divided active carbon powder having a particle size of 5 μm is added to a 2% strength by weight aqueous solution of Basic blue 9 (C.I. 52,015). This suspension is applied to the surface of the tubes of a cooler cooled with surface water. After this procedure, the applied suspension is fixed by treatment with 0.8% strength by weight aqueous silicon, the applied suspension is fixed by treatment with 0.8% strength by weight aqueous silicomolybdic acid. During operation of the cooler with surface water, this surface coating degrades oxidizable compounds in the cooling water and prevents the growth of bacteria and algae.

EXAMPLE 9

Active carbon granules coated as described in Example 1 are employed in a filter bed with aerated seepage water until the degradation efficiency for the TOC is less than 30% for a residence time of 3 hours. Thereafter, the seepage water feed is stopped and the filter bed is operated using circulated oxygen-containing wastewater until 90% of the TOC content has been degraded. In this procedure, the seepage water is again fed to the bed until the TOC degradation falls to ≦30% and the bed is regenerated, the procedure being continued in these cycles.

We claim:

1. A process for the catalytic degradation of oxidizable organic and/or inorganic compounds in waters with an oxidizing agent and a catalyst comprising a carrier, wherein the carrier used is an inert carrier which is coated with a cationic dye laked with heteropolyacids or polyacids or metal salts of subgroups V to VIII or metal acids of subgroups V to VIII, or mixtures thereof.

2. A process as claimed in claim 1, wherein the inert carrier used is a carbon-containing carrier.

3. A process as claimed in claim 1, wherein the cationic dye used is a diarylmethane, triarylmethane, xanthene, acridine, phenazine, oxazine, thiazine, methine or azo dye having an external ammonium group or charge-carrying nitrogen atoms of the chromophore system, or a metal complex dye.

4. A process as claimed in claim 1, wherein a heteropolyacid which consists of metal acids of molybdenum and/or tungsten and/or vanadium and nonmetal acids of phosphorous and/or silicon is used.

5. A process as claimed in claim 1, wherein a polyacid of vanadium and/or molybdenum and/or tungsten is used.

6. A process as claimed in claim 2, wherein coating of the carbon-conaaining catalyst is effected by impregnation with a cationic dye dissolved in a solvent, followed by laking with the aqueous heteropolyacid or polyacid.

7. A process as claimed in claim 2, wherein the carbon-containing catalyst coated with the laked, cationic dye is introduced in the form of a powder into the water containing oxidizable compounds, the mass transfer conditions, the temperature and the feed of oxidizing agent being controlled so that the catalyst has a potential $\epsilon_h + 600$ mV relative to the potential of the hydrogen electrode in the wastewater.

8. A process as claimed in claim 2, wherein the oxidizable organic and/or inorganic water ingredients are oxidized at from 0° to +400° C. in the presence of the carbon-containing catalyst coated with the laked, cationic dye and of the oxidizing agent.

9. A process as claimed in claim 2, wherein the carbon-containing catalyst coated with the laked, cationic dye is used in the form of granules in a static fixed-bed tube reactor through which the water containing oxidizable compounds and oxidizing agent flows.

10. A process as claimed in claim 2, wherein the carbon-containing catalyst coated with the laked, cationic dye is used in the form of granules having a particle size of from 2 to 6 mm.

* * * * *